United States Patent [19]

Oruc et al.

[11] Patent Number: 5,270,956
[45] Date of Patent: Dec. 14, 1993

[54] SYSTEM AND METHOD FOR PERFORMING FAST ALGEBRAIC OPERATIONS ON A PERMUTATION NETWORK

[75] Inventors: Ahmet Y. Oruc, College Park; Vinod G. J. Peris, Greenbelt; Melda Y. Oruc, College Park, all of Md.

[73] Assignee: University of Maryland, College Park, Md.

[21] Appl. No.: 993,898

[22] Filed: Dec. 18, 1992

Related U.S. Application Data

[63] Continuation of Ser. No. 671,077, Mar. 18, 1991, abandoned.

[51] Int. Cl.$^5$ .................................................. G06F 7/72
[52] U.S. Cl. ............................................................ 364/746
[58] Field of Search .............................. 364/746, 746.1

[56] References Cited

U.S. PATENT DOCUMENTS 4,910,699  3/1990  Capps et al. ................. 364/746
5,073,870  12/1991  Morita ............................ 364/746
5,101,431  3/1992  Even ............................... 364/746.1

OTHER PUBLICATIONS

"A Self-Routing Permutation Network", David M. Koppelman, et al., Journal of Parallel and Distributed Computing, 1990, pp. 140-151.
"Implementing Fast Modular Arithmetic Using Permutation Networks", Amit Shah, 1990.
"Fast Modular Arithmetic on Permutation Networks"- 'Vinod G. J. Peris, Computer Science Technical Report Series, May 1991.
"Fast Packet Technology For Future Switches" J. Degan, et al, AT & T Technical Journal, Mar./Apr. 1989, pp. 36-50.
"Sorting Networks and Their Applications" K. E. Batcher, 1968, (Reprinted from the Proceeding of AFIPS, SJCC 1968 pp. 307-314).
"Fast Modular Arithmetic on a Permutation Network (Preliminary Version)", A. Oruc, et al; Computer Science Technical Report Series, University of Maryland, Mar. 1990.
"Implementations of a Fast Arithmetic Unit Using Permutation Networks", F. San Miguel et al; Jul. 1990.
Tai et al., "Optical Residue Arithmetic Computer With Programmable Computation Modules", Applied Optics, vol. 18, No. 16, Aug. 1979, pp. 2812-2823.

Primary Examiner—Long T. Nguyen

[57] ABSTRACT

A system and method is for performing any one of a plurality of arithmetic operations on a permutation network. An arithmetic expression is input, including a first operand, second operand and an arithmetic operator. The first operand is converted to a first permutation and output to the permutation network. The second operand is converted to a second permutation and is also output to the permutation network. The selected arithmetic operation is performed on the first permutation based upon the second permutation within the permutation network to obtain a resultant permutation. The resultant permutation is then decoded into a resultant value and the resultant value is output.

44 Claims, 6 Drawing Sheets

SYSTEM AND METHOD FOR PERFORMING FAST ALGEBRAIC OPERATIONS ON A PERMUTATION NETWORK

This application is a continuation, of application Ser. No. 07/671,077 filed on Mar. 18, 1991, now abandoned.

The present invention relates to a method and system for performing fast algebraic operations, for example, modular arithmetic operations, on a permutation network.

BACKGROUND OF THE INVENTION

Modular arithmetic is used extensively in such computations as prime number factorization, coding, random number generation, matrix multiplication, polynomial algebra, solution of linear equations, and discrete Fourier transforms, among others. Despite this, conventional algorithms for carrying out multiplication, division and powering in modular arithmetic are cumbersome and do not lend themselves to parallelization very easily. A more serious problem with these algorithms is that they are structurally different. The structural difference leads to different hardware structures necessary for different arithmetic operations; for example, multiplication and addition cannot use the same hardware unless a serial multiplication algorithm is used. However, this results in a reduction in speed which is often intolerable.

SUMMARY OF THE INVENTION

One object of the present invention is to create a system and method which unify the modular arithmetic operations through utilization of a permutation network. This scheme relies on a fundamental result of Cayley on isomorphisms between finite groups and permutation groups. Accordingly, one object of the present invention, using this fact, is to create a system and method to perform the operations of modular addition, subtraction, multiplication and division, reduced to realized permutations, on a permutation network.

A further object of the present invention is to create a method for performing any one of a plurality of modular arithmetic operations on a permutation network.

A still further object of the present invention is to create a system for performing any one of a plurality of modular arithmetic operations on a permutation network.

A still further object of the present invention is to create a system which can utilize any one of a plurality of converting devices and any one of a plurality of permutation networks to perform any one of a plurality of arithmetic operations on a permutation network.

A still further object of the present invention is to create a method for performing any one of a plurality of arithmetic operations on a permutation network.

A still further object of the present invention is to create a system and method for operating on any abstract algebraic system called a group, converting that group to a permutation, representing the abstract algebraic system called a group, and performing any one of a plurality of group operations on the permutations.

A still further object of the present invention is to create parallel arithmetic circuits and algorithms utilizing the above-mentioned permutation network system and method.

A still further object of the present invention is to create matrix algebra circuits and algorithms in a similar fashion utilizing the permutation network system and method.

A still further object of the present invention is to create signal processing circuits and algorithms utilizing the permutation network system and method.

Finally, a further object of the present invention is to realize coding and encryption circuits and algorithms utilizing the permutation network system and method.

These objects of the present invention are fulfilled by providing a method of performing any one of a plurality of arithmetic operations on a cascaded plurality of permutation networks, comprising the steps of:

(a) inputting an arithmetic expression, including first operand, second operand and an arithmetic operator;

(b) converting said first operand based upon arithmetic operator, to a first permutation;

(c) converting said second operand based upon said arithmetic operator, to a second permutation;

(d) implementing said first permutation on a first permutation network;

(e) implementing said second permutation on said second permutation network, cascaded to said first permutation network;

(f) outputting a resultant permutation from said second permutation network;

(g) converting said resultant permutation into a resultant value; and (h) outputting said resultant value.

The objects of the present invention are further fulfilled by providing a system for performing any one of a plurality of modular arithmetic operations on a permutation network, comprising:

input means, for inputting a modular arithmetic expression, including first operand, second operand, a modular operator and a prime modular base;

subtracting means for subtracting from the prime modular base to get a non-prime-modular base;

factoring means for factoring the non-prime modular base into ascending prime factors;

first converting means for converting said first operand based upon said arithmetic operator and said ascending prime factors, to a first permutation and for converting said second operand based upon said arithmetic operator and said ascending prime factors, to a second permutation;

implementing means for implementing said first permutation on a permutation network;

controlling means for controlling said permutation network based upon said second permutation to produce a resultant permutation;

second converting means for converting said resultant permutation to a resultant value; and output means for outputting said resultant value from said second converting means.

These and other objects of the present invention will become more readily apparent from the detailed description given hereinafter. However, it should be understood that a detailed description and specific examples, while indicating preferred embodiments of the invention, are given by way of illustration only since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration and thus are not limitative of the present invention and wherein.

It should be noted that throughout the drawing figures like numerals represent like elements.

DETAILED DESCRIPTION OF THE PREFERRED EMBODIMENTS

Figure 1:
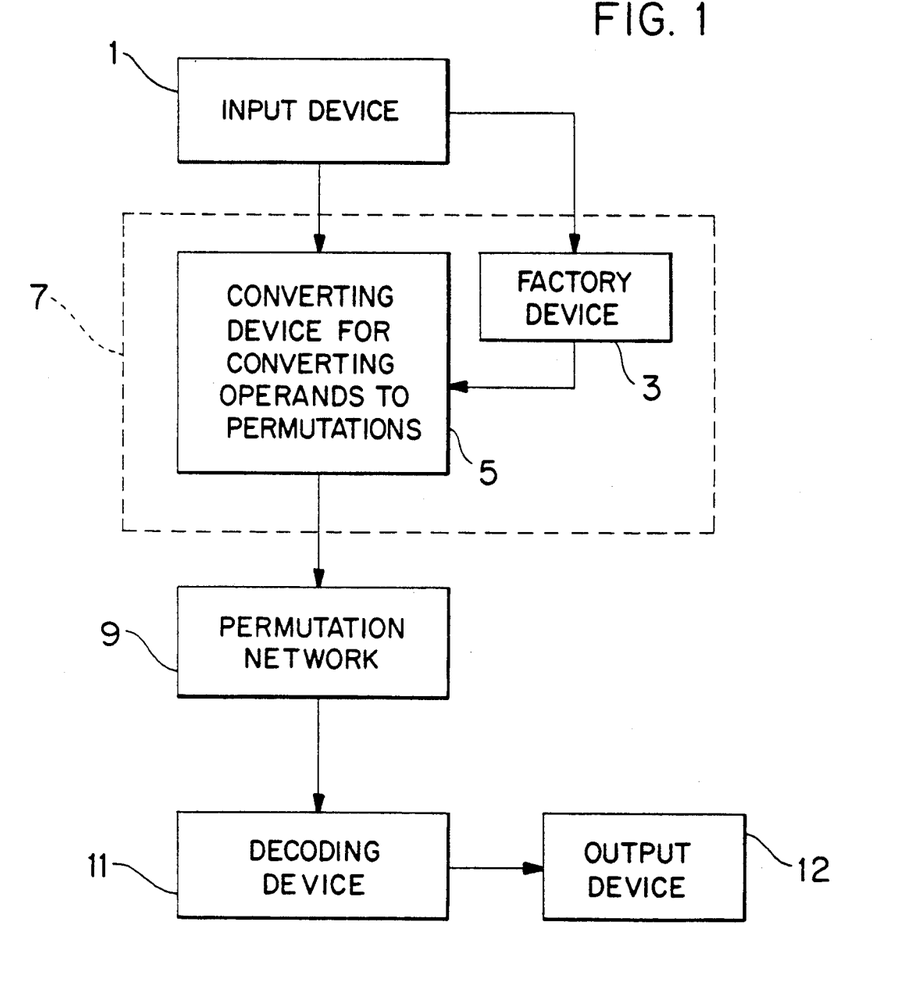
FIG. 1 illustrates a general embodiment of the present invention.

FIG. 1 illustrates an input device for inputting, for example, a modular arithmetic expression. Such a modular arithmetic expression would include a first operand, a second operand, a modular operator, and a prime modular base, each input through the input device 1. However, the system and method of the present invention are not limited to such an input modular arithmetic expression. Any arithmetic or algebraic expression which includes a first operand, a second operand and an arithmetic or algebraic operator may be utilized and input through an appropriate input device. Therefore, one could input an expression, such as a particular polynomial expression or a plurality of matrices, for example, through an appropriate input device into the system as shown in FIG. 1. Also, although multiplication, division, addition, and subtraction in modular arithmetic can be performed, the system of the present invention is not limited to such modular arithmetic operations. For example, powering, that is raising a particular expression to a particular exponential value, in modular arithmetic can also be performed. Further, any group of elements which can be organized in a particular group table can be input to the system of the present invention for a subsequent operation to be performed.

The input device of FIG. 1, as previously stated, inputs the first and second operand and a particular arithmetic expression. In the case of a modular arithmetic operation, for example, input of the prime modular base will then be sent to a factoring device 3. This factoring device, as will be subsequently described, reduces the prime modular base to a lower order, for example, reduces modulo 11 (11 being prime) to 10. This is because multiplication in modulo 11 is isomorphic to a cyclic permutation group of order 10. Thus, the lower order can be factored, but does not need to be factored, into a plurality of prime factors (for example, 10 can be factored into 5, and 2 to produce a minimum number of input lines necessary) as will be subsequently explained. These operations of the factoring device can be performed, for example, by a microprocessor which has been preprogrammed with the appropriate information, as would be well known to those of ordinary skill in the art.

Accordingly, outputs from the factoring device 3 and the input device 1 are then input to a converting device 5 for converting the first and second operands to a first and second permutation, respectively. Accordingly, as will subsequently be described, both the factoring and the converting can be performed by a plurality of alternate methods and devices, and in most instances, by the same device, and thus are labeled together as encoding device 7. Encoding device 7 thereby encodes or converts each of the input first and second operand to their appropriate permutations.

The outputs from encoding device 7 are then implemented to permutation network 9. The permutation network emulates the particular arithmetic operation, for example, a modular arithmetic operation, based upon the implemented first and second permutation and the modular operator. The permutation network then outputs a resultant permutation.

The permutation network 9 is connected to a decoding device 11 which receives the output resultant permutation. This decoding device then decodes or converts the resultant permutation into a resultant value. The decoding device can then output the resultant value to output device 12, which can then output the decoded resultant value for subsequent use. The decoding device operates similar to the encoding device, only in an inverse manner. Thus, for the sake of brevity, further explanation of the decoding device will be omitted since one of ordinary skill in the art could make and use an appropriate decoding device when presented with an appropriate encoding device as described hereinabove and further described hereinafter.

Figure 2:
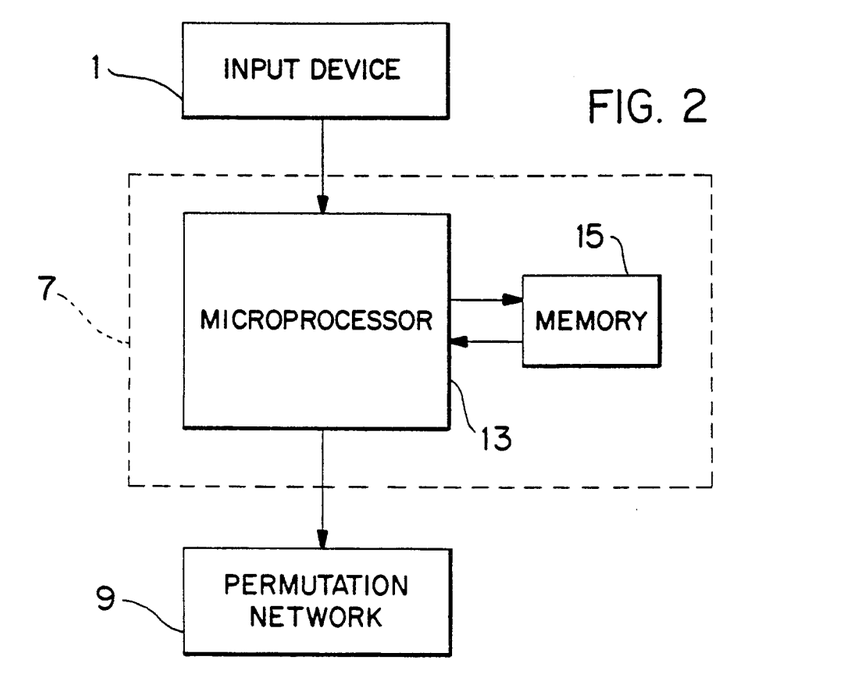
FIG. 2 illustrates a first embodiment of the encoding device of FIG. 1.

FIG. 2 illustrates a particular embodiment of the encoding device 7. In this embodiment, the encoding device 7 receives the first and second operand and the arithmetic operator from the input device 1. This information is then input to a microprocessor 13. The microprocessor then processes the first and second operand and, based upon the particular arithmetic operation to be achieved by the system and based upon each particular operand, the microprocessor then accesses and obtains a permutation for each of the first and second operand from memory 15.

Memory 15 prestores, in this embodiment, a plurality of tables corresponding to particular operands, corresponding permutations and further corresponding to various arithmetic functions such as addition, subtraction, multiplication and division, as will be described subsequently. The memory 15 can be that of a preprogrammed read only memory, for example, but is not limited to such a memory. This memory 15, being connected to microprocessor 13, can then output the accessed permutations to microprocessor 13. Microprocessor 13 then implements the permutations on permutation network 9, in a manner similar to that previously described.

Figure 3:
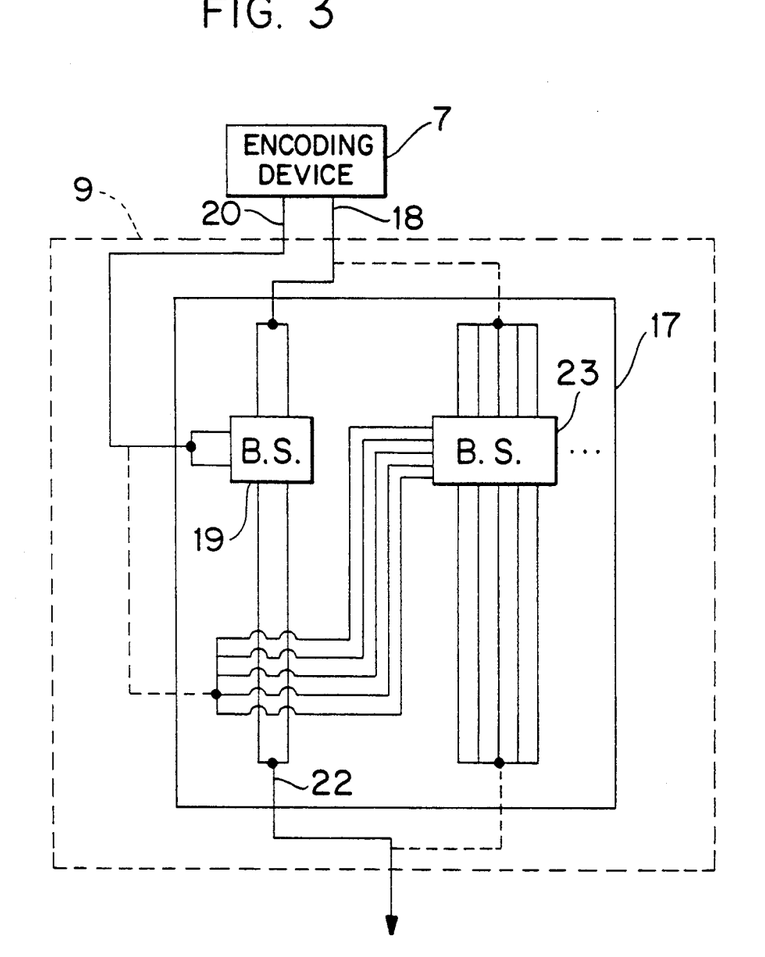
FIG. 3 illustrates a first embodiment of the permutation network of FIG. 1.

FIG. 3 illustrates a first embodiment of the permutation network 9. It should be noted that any and all embodiments of the permutation network, and/or the encoding/decoding devices, are merely illustrative and thus should not be considered in any way limiting. A plurality of devices, which one of ordinary skill in the art would consider equivalent to those illustrated in the present application, can thus be substituted.

Permutations, as will be subsequently described, can be implemented on a single permutation network by simple cyclical shifts of elements. Accordingly, the permutation network 9, upon receiving output information from encoding device 7, can then utilize a plurality of barrel shifters indicated by elements 19 and 23 in FIG. 3 to perform a plurality of cyclical shifts. The permutation corresponding the first operand can be input to respective barrel shifters 19 and 23 through input data line 18. Further, each of the elements of the first permutation, namely two elements corresponding to barrel shifter 19 and five elements corresponding to barrel shifter 23, can thus be shifted an appropriate number of positions, as controlled by elements of the second permutation through line 20. Accordingly, in the exemplary embodiment shown in FIG. 3, a two element barrel shifter 19 corresponding to a cycle of length 2 and a five element barrel shifter 23 corresponding to a cycle of length 5, have been chosen because modulo 11 uses 10 elements and a permutation group of order 10 is necessary to emulate this. Thus, the smallest cyclic group would have 2+5 or 7 elements. 2 and 5 are chosen because 2×5=10. Accordingly, it should be apparent that the 2 element and 5 element barrel shifters, represented by 19 and 23 in FIG. 3, are merely exemplary. Therefore, it should be apparent that a plurality of additional barrel shifters, if required, are also present in the barrel shifting network 17, as illustrated in FIG. 3.

Therefore, the permutations of the first and second operand are output from the encoding device 7 to the barrel shifting network 17 through line 18 and 20, respectively, to the appropriate barrel shifting device 19 and 23, etc. of barrel shifting network 17 within the permutation network 9. Finally, the shifted values output from each of the barrel shifters are then subsequently input to decoding device 11 through output lines 22.

Figure 4:
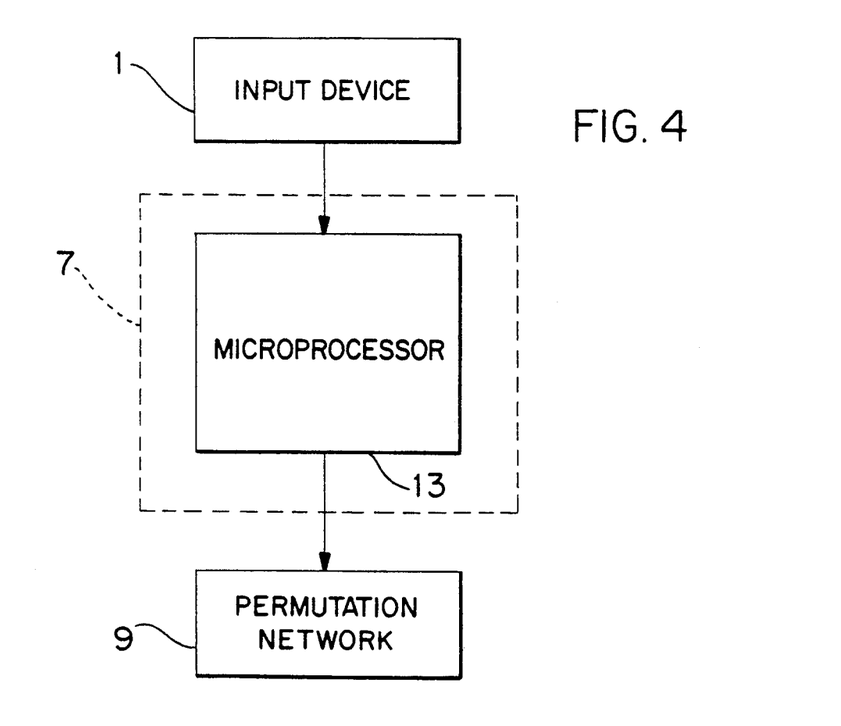
FIG. 4 illustrates a second embodiment of the encoding device of FIG. 1.

FIG. 4 illustrates a second embodiment of the encoding device 7. In this embodiment, a microprocessor 13, within the encoding device, receives the input operands and arithmetic operations. The microprocessor 13 then implements permutations for each of the plurality of operands based upon an algorithm known to those of ordinary skill in the art, and then outputs the permutations to permutation network 9, along with information necessary to perform the selected arithmetic operation.

Figure 5:
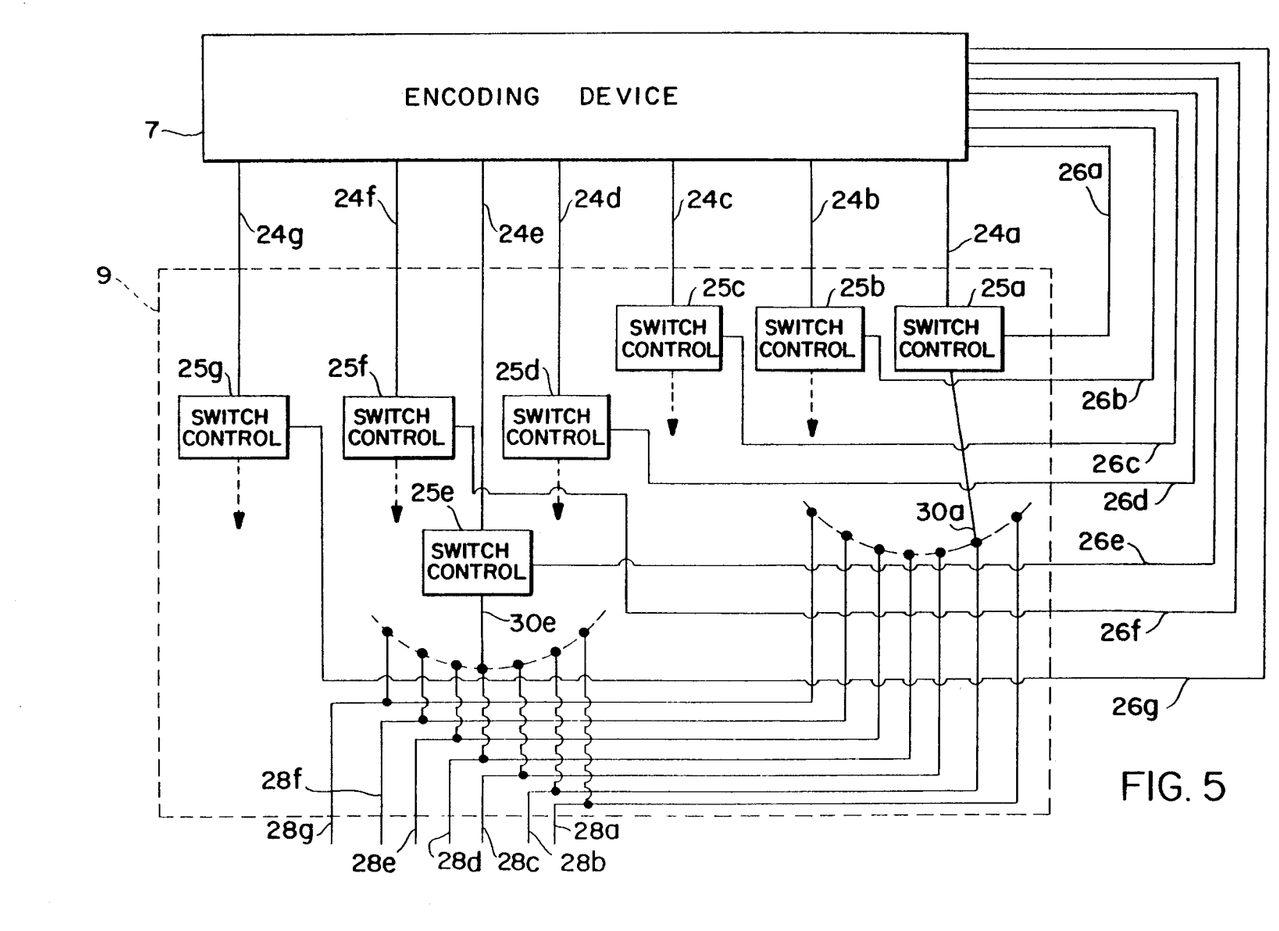
FIG. 5 illustrates a second embodiment of the permutation network of FIG. 1.

FIG. 5 illustrates a second embodiment of the permutation network 9. In this embodiment, encoding device 7 outputs a permutation for a first operand through the various output data lines 24(a) to 24(g). Accordingly, in this exemplary embodiment, the encoding device 7 has implemented a permutation for the first operand into a set of seven sequential numerical digits, each of a different value. Therefore, as is illustrated in FIG. 5, the data output lines of encoding device 7 are labeled 24(a) to 24(g). It should be noted that such a number of data lines is exemplary and further, the system can be designed such that a greater number of data lines can potentially be utilized, with only particular data lines being utilized in each particular instance. Further, the choosing of seven data lines and seven control lines, to be discussed subsequently has merely been chosen as to correspond to the operational example to be described subsequently with regard to FIG. 7. Thus, FIG. 5 should not be considered to be, in any way, limiting.

Each of these input data lines 24(a) to 24(g) inputs their particular value into permutation network 9. Further, the permutation of the second operand, similarly shown, in an exemplary manner, implemented into seven sequential numerical digits by encoding device 7 are each output through control lines 26(a) through 26(g) to the permutation network 9. Each data line 24(a) for example, are input, with its corresponding control line, 26(a), for example, to a switch control device, 25(a), for example. This switch control device 25(a) then switches the data value of line 24(a) to one of a plurality of seven output lines, based upon the control information on line 26(a). Similarly, the remaining lines 24(b) to 24(g) are connected to a plurality of individual switching control devices, 25(b) to 25(g) along with their corresponding control lines, 26(b) to 26(g). Each of the switching control devices, 25(a) to 25(g), switches one of the plurality of input data lines to a different one of the plurality of output lines, 28(a) to 28(g). Thus, one value will be input through a particular data line, 24(a) to 24(g), and will be output to one and only one of the lines 28(a) to 28(g) based upon the control values 26(a) to 26(g) input to switch control devices 25(a) to 25(g). Thereafter, the corresponding input data value, will be input through the permutation network 9 and then output on a particular potentially different sequential output line, 28(a) to 28(g) to a decoding device 11 for subsequent decoding.

For example, in FIG. 5, it is shown that a data value is output on line 24(a), controlled by line 26(a) and switched by switch control 25(a) to output line 28(b). Therefore, a particular data value input on line 24(a) will be output on line 28(b). Further, the data value input on line 24(e), controlled by line 26(e), is switched by switch control 25(e) to line 28(d). Therefore, the data input on line 24(e) will be output on line 28(d). Thus, in such a switching control network, similar switches are illustrated by 30(a) and 30(e), exist to connect one of the input data lines 24(a) to 24(e) to one and only one of the output data lines 28(a) to 28(g).

Figure 6:
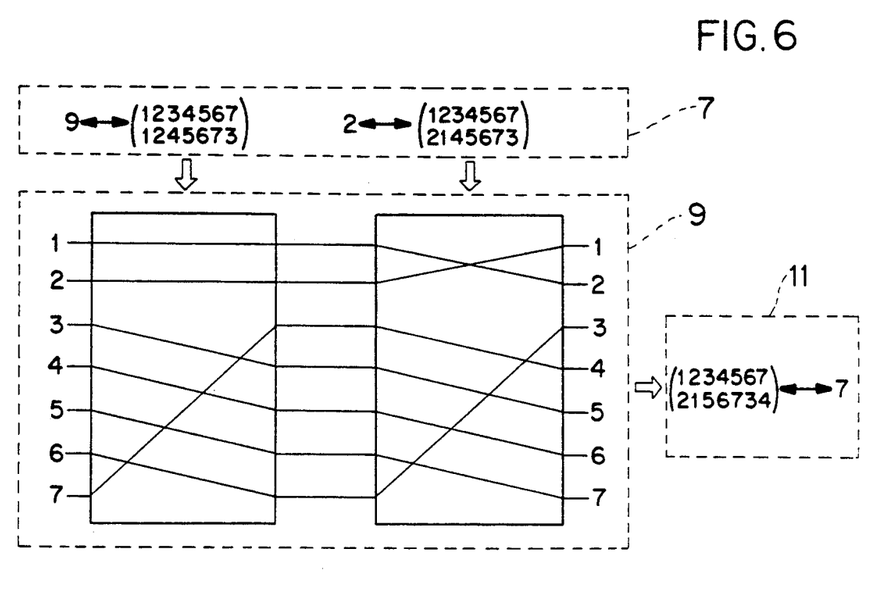
FIG. 6 illustrates a first example of the encoding device, permutation network, and decoding device utilized in describing operation of the present invention.

FIG. 6 illustrates an exemplary aspect of the present invention illustrating the permutation of operand "9", in modulo 11, of a plurality of sequential values as obtained by encoding device 7. Similarly, the permutation of operand "2" in modulo 11 is illustrated as obtained by the encoding device 7. Accordingly, the first and second permutations are then implemented on a respective first and second permutation network of the permutation network 9. Thereby, a resultant permutation is output as a particular set of sequential values which is decoded or converted in decoding circuit 11, to yield the resultant value "7" in modulo 11. Accordingly, FIG. 6 shows the example of 9⊗2 modulo 11, resulting in a value of "7" in modulo 11.

Figure 7:
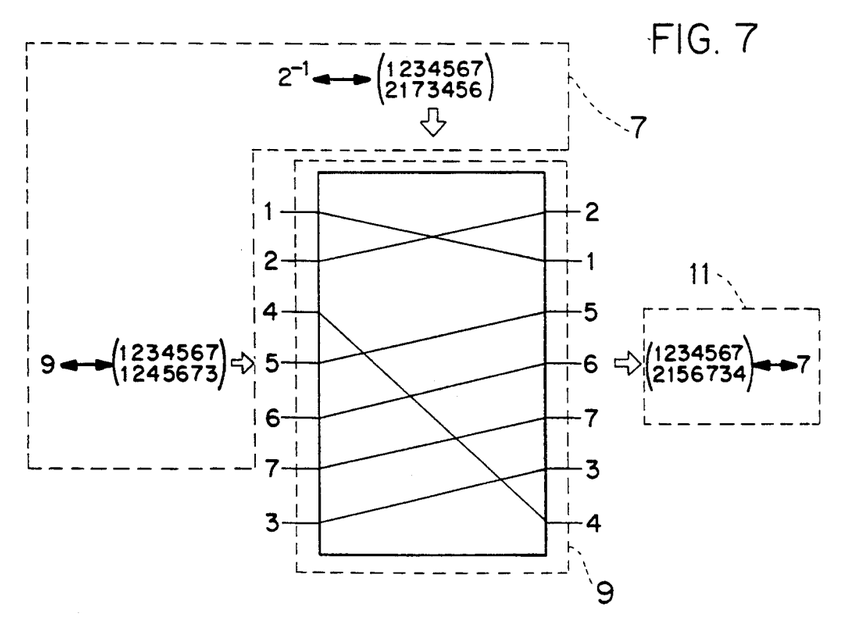
FIG. 7 illustrates a second example of the encoding device, permutation network and decoding device used in describing operation of the present invention.

FIG. 7 illustrates the combining of the two permutation networks illustrated in FIG. 6 into a single permutation network. The permutation corresponding to the operand "9" and the permutation (in this example) corresponding to the inverse of the operand "2", from the encoding device 7, are implemented on the single permutation network 9. Accordingly, the permutation corresponding to inverse of the operand "2" is utilized to control the permutation network by controlling the connection of each of the inputs of permutation network 9 to connect to one and only one of the outputs of permutation network 9. Further, the sequential values of the permutation corresponding to operand "9" are input through seven (which is only exemplary and should not be considered limiting) inputs as shown corresponding to permutation network 9. These sequential values, aligned with particular inputs of the permutation network 9, are then controlled to be connected to particular outputs, based upon the permutation corresponding to the inverse of second operand, illustrated as $2^{-1}$. Thereafter, the output resultant permutation is then decoded by decoding circuit 11, by converting the resultant permutation to "7". Accordingly, similar to that previously described with regard to FIG. 6, FIG. 7 illustrates the performance of the operation $9 \otimes 2$ modulo $11 = 7$.

A thorough example involving the theory behind the present invention and further illustrating the utilization of multiplication in modulo 11 will be described hereinafter. It should be emphasized that such a description is merely exemplary and does not serve to limit the present application in any manner.

Division in modulo m can be carried out by multiplying the dividend with the inverse of the divisor, and therefore will not be discussed separately. The terms utilized are known to those of ordinary skill in the art and can be found with reference to a text on number theory.

First, let $\phi$ (m) (so-called "Euler's phi" function) denote the number of positive integers which are less than or equal to, and relatively prime to m. It is known that $\phi(m)$ residue classes relatively prime to m form an abelian group of order $\phi(m)$, denoted $(G_m, \otimes)$ where, for any $g_1, g_2 \in G_m$, $\otimes$ is defined as $g_1 \otimes g_2 = g_1 g_2 \mod m$. Let g be a residue class which is relatively prime to m, and define the order of $g \in G_m$ with respect to modulus m as the smallest exponent e such that $g^{-e} \equiv 1 \pmod{m}$. If $e = \phi(m)$ then g is called a primitive root of $G_m$.

TABLE 1A

| $\otimes$ | \multicolumn{4}{c}{$(G_5, \otimes)$} | | | |
|---|---|---|---|---|
| | 1 | 2 | 3 | 4 |
| 1 | 1 | 2 | 3 | 4 |
| 2 | 2 | 4 | 1 | 3 |
| 3 | 3 | 1 | 4 | 2 |
| 4 | 4 | 3 | 2 | 1 |

TABLE 1B

| $\bullet$ | \multicolumn{4}{c}{$(R_5, \bullet)$} | | | |
|---|---|---|---|---|
| | $p_1$ | $p_2$ | $p_3$ | $p_4$ |
| $p_1$ | $p_1$ | $p_2$ | $p_3$ | $p_4$ |
| $p_2$ | $p_2$ | $p_4$ | $p_1$ | $p_3$ |
| $p_3$ | $p_3$ | $p_1$ | $p_4$ | $p_2$ |
| $p_4$ | $p_4$ | $p_3$ | $p_2$ | $p_1$ |

In particular, if m is a prime (a prime number) then $G_m$ has $m-1$ elements which are the residue classes $\{n_1:n_1 \equiv 1 \pmod{m}\}$, $\{(n_2:n_2 \equiv 2 \pmod{m})\}$, ..., $\{n_{m-1}:n_{m-1} \equiv m-1 \pmod{m}\}$, and every primitive root of $G_m$ is a residue class of order $m-1$. A theorem of Gauss states that if $d | m-1$ where m is a prime then there are $\phi(d)$ residue classes of order d modulo m. Thus, $G_m$ has $\phi(m-1)$ distinct primitive roots. Let $g \in G_m$, where m is a prime, be any one of these primitive roots. It can be shown that $g, g^2, \ldots, g^{m-1}$ are all distinct. Since $G_m$ has $m-1$ elements, it follows that any element of $G_m$ can be generated by g, and therefore $(G_m, \otimes)$ is a cyclic group. As stated, the elements of this group are residue classes modulo m. Nonetheless, here the present system and method is concerned only with the representatives of these classes, namely, the first $m-1$ positive integers, 1, 2, ... $m-1$, in which case $(G_m, \otimes)$ simply corresponds to multiplication modulo m.

Now, to carry out this multiplication, Cayley's theorem on isomorphisms between finite groups and permutation groups is exploited. This theorem states that every finite group $(G, \otimes)$ is isomorphic to a permutation group, and furthermore, its proof provides an explicit construction of such a permutation group which is called the regular representation of G. This representation is given by $R = \{\rho_a: a \in G\}$ where $\rho_a$ is defined as $\rho_a: g \to a \cdot g$, for all $g \in G$. In particular, the regular representation of $(G_m, \otimes)$ is given by $(R_m, \bullet)$ where $R_m = \{\rho_i: 1 \leq i \leq m-1\}$ and $\rho_i: j \to i \otimes j$ for all j; $1 \leq j \leq m-1$. These ideas are illustrated by tables of $G_5$ and $R_5$ (1A and 1B), wherein $$Q_1 = \begin{pmatrix} 1234 \\ 1234 \end{pmatrix}; Q_2 = \begin{pmatrix} 1234 \\ 2413 \end{pmatrix}; Q_3 = \begin{pmatrix} 1234 \\ 3142 \end{pmatrix}; Q_4 = \begin{pmatrix} 1234 \\ 4321 \end{pmatrix}$$

The degree of permutation group G is defined as the cardinality of the set of elements upon which the permutations in G act. While the regular representation of $(G_m, \otimes)$ facilitates a means for converting multiplications of integers to compositions of permutations, the degree of $R_m$ grows linearly with m and this may render its use impractical for large values of m. This is because realizing $R_m$ ultimately needs a permutation network whose complexity grows at least at the rate of $m \log_2 m$. This problem can be avoided if another permutation group exists which is isomorphic to $(G_m, \otimes)$ and of order $m-1$, but degree less than $m-1$. The following theorem shows that this is possible.

Theorem 1: If m is a prime and $$m - 1 = m_1^{q_1} m_2^{q_2} \ldots m_k^{q_k} \text{ where } m_1, m_2, \ldots, m_k$$

are relatively prime then $(G_m, \otimes)$ is isomorphic to a cyclic group of permutations of order $m-1$ and degree $$\Sigma_{i=1}^{k} m_i^{q_i}.$$

Proof: Let $(H_{m-1}, \bullet)$ be the group of permutations generated by the product of pairwise disjoint cycles $c_i, 1 \leq i \leq k$ where $c_i$ is of length $$m_i^{q_i}, 1 \leq i \leq k.$$

$(H_{m-1}, \bullet)$ is, obviously, a cyclic group of order $m-1$. Furthermore, since m is a prime, $G_m$ is also a cyclic group of order $m-1$. It follows that $(G_m, \otimes)$ is isomorphic to $(H_{m-1}, \bullet)$ ||

Let m be a prime such that $m-1$ has a prime factorization $$m - 1 = m_1^{q_1} m_2^{q_2} \ldots m_k^{q_k}.$$

Figure 8:
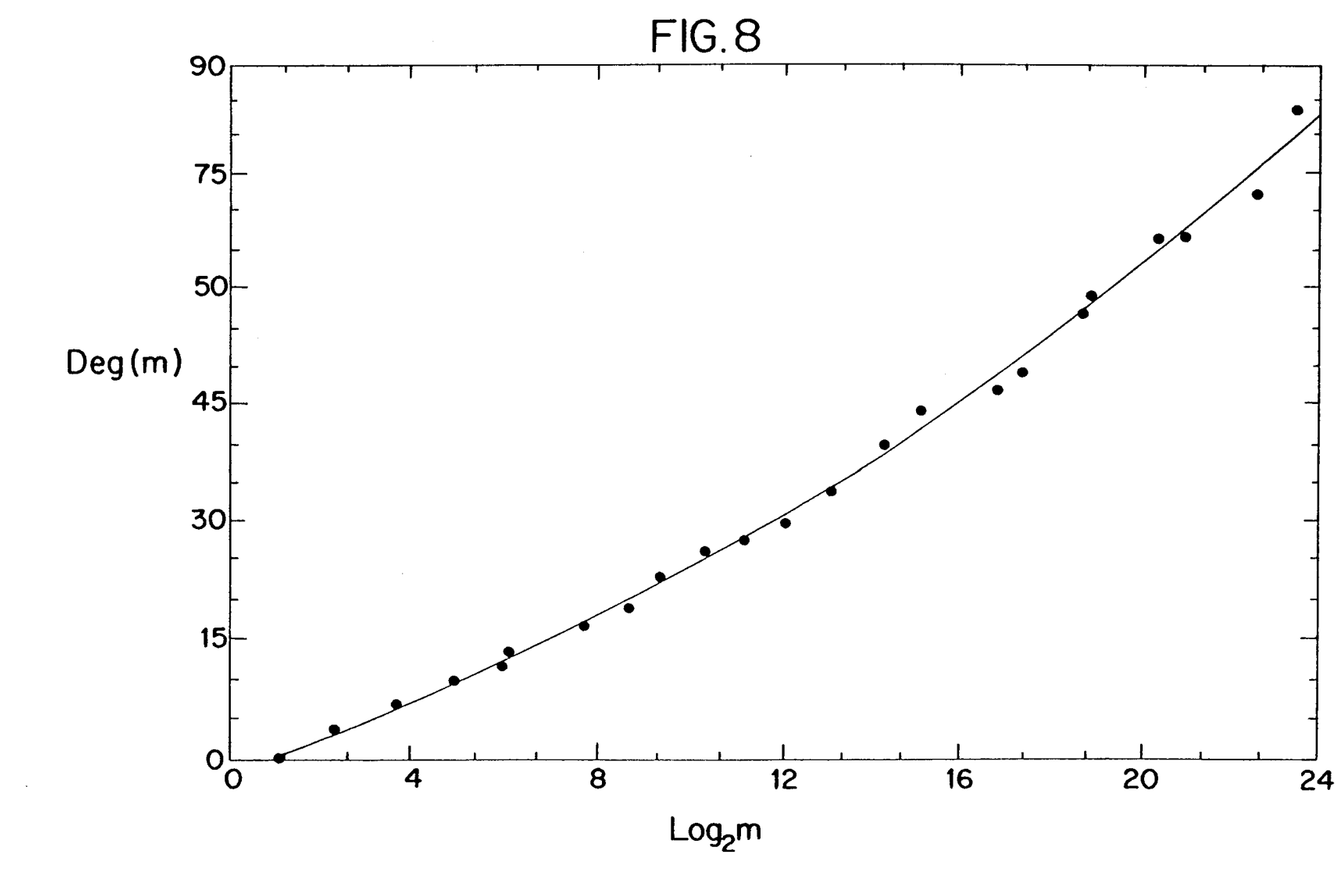
FIG. 8 illustrates a graph showing how Deg(m) increases at roughly the same rate as $\log_2 m$ for $0 \leq r \leq 24$.

Further, $$\Sigma_i^k = m_i^{q_i}$$

is the degree of m, and denoted Deg(m). Deg(m) increases at a slower rate than m. FIG. 8 shows a graph illustrating how slowly it increases in a plot of Deg(m) versus $\log_2 m$, where each point in the graph corresponds to an actual prime in the interval $[2^r, 2^{r+1}]$, for a given positive interger $r; 0 \leq r \leq 24$ and whose degree is minimal. These primes along with their degrees were computed using Mathetmatica, and are shown in Table 1. The plot in the graph of FIG. 8 indicates that for $0 \leq r \leq 24$, the Deg(m) grows roughly at the same rate as $\log_2 m$. Therefore, for $0 \leq m \leq 24$, there exists at least one prime m in the interval $[2^r, 2^{r+1}]$ whose degree is about $\log_2 m$. This, when combined with Theorem 1, implies that the degree of $H_{m-1}$ in the same interval also increases at the same rate as a function of m. Thus, Theorem 2 states:

Theorem 2: For each integer r; $0 \leq r \leq 24$, the degree of $(H_m, \bullet)$ is about $(\log_2 m)$, where m is a prime which falls between $2^r$ and $2^{r+1}$. ||

The problem of constructing an isomorphism between $G_m$ and $(H_{m-1}, \bullet)$ will subsequently be described. Since both groups are cyclic, all we have to do is to map a generator of $G_m$ onto a generator of $(H_{m-1}, \bullet)$. Theorem 1 already specifies a generator for $(H_{m-1}, \bullet)$ in terms of a set of pairwise disjoint cycles $c_i$; $1 \leq i \leq k$ whose lengths are determined by the prime factors of $m-1$. Thus, all that must be determined is a generator for $G_m$. In general, there are known methods to find the primitive roots of m when m is prime. In fact, a known theorem shows that primitive roots exists only for the numbers 2, 4, $m^q$ and $2m^q$ where $m \geq 3$ is an odd prime and $q \geq 1$.

TABLE 2

| Primes with minimum degrees up to $2^{24}$. | |
|---|---|
| Prime m | Deg (m) |
| 2 | 1 |
| 5 | 4 |
| 13 | 7 |
| 31 | 10 |
| 61 | 12 |
| 71 | 14 |
| 211 | 17 |
| 421 | 19 |
| 661 | 23 |
| 1321 | 27 |
| 2311 | 28 |

TABLE 2-continued

| Primes with minimum degrees up to $2^{24}$. | |
|---|---|
| Prime m | Deg (m) |
| 4621 | 30 |
| 9241 | 34 |
| 20021 | 40 |
| 36037 | 44 |
| 120121 | 47 |
| 1801811 | 49 |
| 471241 | 57 |
| 526681 | 59 |
| 1492261 | 66 |
| 2282281 | 66 |
| 6846841 | 72 |
| 131,231,111 | 83 |

TABLE 3

Isomorphism between $G_{11}$ and $H_{10}$

| | | $\otimes$ | 1 | 2 | 3 | 4 | 5 | 6 | 7 | 8 | 9 | 10 |
|---|---|---|---|---|---|---|---|---|---|---|---|---|
| $p^0 =$ | $\begin{pmatrix} 1234567 \\ 1234567 \end{pmatrix}$ $\longrightarrow$ | 1 | 1 | 2 | 3 | 4 | 5 | 6 | 7 | 8 | 9 | 10 |
| $p^1 =$ | $\begin{pmatrix} 1234567 \\ 2145673 \end{pmatrix}$ $\longrightarrow$ | 2 | 2 | 4 | 6 | 8 | 10 | 1 | 3 | 5 | 7 | 9 |
| $p^8 =$ | $\begin{pmatrix} 1234567 \\ 1267345 \end{pmatrix}$ $\longrightarrow$ | 3 | 3 | 6 | 9 | 1 | 4 | 7 | 10 | 2 | 5 | 8 |
| $p^2 =$ | $\begin{pmatrix} 1234567 \\ 1256734 \end{pmatrix}$ $\longrightarrow$ | 4 | 4 | 8 | 1 | 5 | 9 | 2 | 6 | 10 | 3 | 7 |
| $p^4 =$ | $\begin{pmatrix} 1234567 \\ 1273456 \end{pmatrix}$ $\longrightarrow$ | 5 | 5 | 10 | 4 | 9 | 3 | 8 | 2 | 7 | 1 | 6 |
| $p^9 =$ | $\begin{pmatrix} 1234567 \\ 2173456 \end{pmatrix}$ $\longrightarrow$ | 6 | 6 | 1 | 7 | 2 | 8 | 3 | 9 | 4 | 10 | 5 |
| $p^7 =$ | $\begin{pmatrix} 1234567 \\ 2156734 \end{pmatrix}$ $\longrightarrow$ | 7 | 7 | 3 | 10 | 6 | 2 | 9 | 5 | 1 | 8 | 4 |
| $p^3 =$ | $\begin{pmatrix} 1234567 \\ 2167345 \end{pmatrix}$ $\longrightarrow$ | 8 | 8 | 5 | 2 | 10 | 7 | 4 | 1 | 9 | 6 | 3 |
| $p^6 =$ | $\begin{pmatrix} 1234567 \\ 1245673 \end{pmatrix}$ $\longrightarrow$ | 9 | 9 | 7 | 5 | 3 | 1 | 10 | 8 | 6 | 4 | 2 |
| $p^5 =$ | $\begin{pmatrix} 1234567 \\ 2134567 \end{pmatrix}$ $\longrightarrow$ | 10 | 10 | 9 | 8 | 7 | 6 | 5 | 4 | 3 | 2 | 1 |

To illustrate how the construction of an isomorphism between $(G_m, \otimes)$ and $(H_{m-1}, \bullet)$, is obtained, group tables for $(G_{11}, \otimes)$ $(H_{10}, \otimes)$ are depicted in Table 3. $G_{11}$ has $\phi(11-1)=4$ generators, i.e., 2,6,7 and 8 which are the primitive roots of 11. The generator for $H_{10}$ is $$\begin{pmatrix} 1234567 \\ 2145673 \end{pmatrix}.$$

So, an isomorphism $\eta$ between $G_{11}$ and $H_{10}$ can be defined by $\eta$: $(a^i \rightarrow p^i; 0 \leq i < 10$, where a is any of the numbers, 2,6,7,8, and $$p = \begin{pmatrix} 1234567 \\ 2145673 \end{pmatrix}.$$

With the isomorphism defined this way, the multiplication over $G_{11}$ can be carried out by composing permutations in $H_{10}$. For example, $5 \otimes 7 = 2$ in $G_{11}$ corresponds to (with a=2)

$$\begin{pmatrix} 1234567 \\ 1273456 \end{pmatrix} \cdot \begin{pmatrix} 1234567 \\ 2156734 \end{pmatrix} = \begin{pmatrix} 1234567 \\ 2145673 \end{pmatrix}.$$

An example will now be described for performing addition and subtraction in modulo m. It is known that the set $\{0,1, \ldots, m-1\}$ with the addition operation modulo m forms a cyclic group of order m. Denote this group by $(Z_m, \oplus)$. Since, for any two integers a,b, $a-b$ mod $m = a + (m-b)$ mod m, only addition over $Z_m$ need be considered. In fact, once an isomorphism between $(Z_m, \oplus)$ and a permutation group is constructed, then computing the additive inverse of a number $b \in Z_m$, i.e., $-b$, corresponds to computing the inverse of a permutation in the permutation group, and this is trivial.

Since $(Z_m, \oplus)$ is cyclic as in the case of multiplicative groups, an isomorphism between $(Z_m, \oplus)$ and a cyclic groups of permutations of order m can be constructed. This group is denoted by $(H_m, \bullet)$, as before. This time, the element 1 is a generator of $(Z_m, \oplus)$ and therefore the isomorphism $(Z_m, \oplus)$ and $(H_m, \bullet)$ is defined by $\eta:(1^i) \rightarrow \rho^i$; $0 \leq i < m$, where $1^i$ means "add 1 i times modulo m," and $\rho$ is a generator of $(H_m, \bullet)$. As an illustration, the isomorphism between $(Z_{10}, \oplus)$ and $H_{10}, \bullet)$ is depicted in Table 4. The only other difference is that $(Zm, \oplus)$ is of order m whereas $(G_m, \otimes)$ is of order $m-1$. Nonetheless, this poses no threat, as far as carrying out addition and multiplication operations by composing permutations over a computer permutation network, as will subsequently be described.

Now that the isomorphisms between $(Z_m, \oplus)$ and $(H_m, \bullet)$, and $(G_m, \otimes)$ and $(H_{m-1}, \bullet)$ are defined, $(Z_m, \oplus)$ and $(Gm, \otimes)$ can be realized on a permutation network. Such networks are used in telephone switching and in parallel computers, and are typically constructed by cascading small crossbar switches. Here, they are used to compose permutations which, and by the arguments of the preceding section, amounts to adding or multiplying numbers.

To illustrate this with an example, FIG. 6 shows how to multiply $9 \otimes 2$ mod 11. The permutation network on the left is programmed to realize the permutation corresponding to 9 in Table 3, while the permutation network on the right realizes the permutation corresponding to 2. The two permutation networks cascaded together realize the resultant permutation corresponding to $7 = 9 \otimes 2$ mod 11. It can be seen that the product of the two numbers which are being multiplied is coded in the form of a permutation which the permutation network represents by a set of paths connected between its inputs and outputs. A similar example can be given for addition as well.

TABLE 4

| | | Isomorphism between $Z_{10}$ and $H_{10}$ | | | | | | | | | | |
|---|---|---|---|---|---|---|---|---|---|---|---|---|
| | | $\oplus$ | 0 | 1 | 2 | 3 | 4 | 5 | 6 | 7 | 8 | 9 |
| $p^0 =$ | $\begin{pmatrix} 1234567 \\ 1234567 \end{pmatrix}$ | $\longrightarrow$ 0 | 0 | 1 | 2 | 3 | 4 | 5 | 6 | 7 | 8 | 9 |
| $p^1 =$ | $\begin{pmatrix} 1234567 \\ 2145673 \end{pmatrix}$ | $\longrightarrow$ 1 | 1 | 2 | 3 | 4 | 5 | 6 | 7 | 8 | 9 | 0 |
| $p^2 =$ | $\begin{pmatrix} 1234567 \\ 1256734 \end{pmatrix}$ | $\longrightarrow$ 2 | 2 | 3 | 4 | 5 | 6 | 7 | 8 | 9 | 0 | 1 |
| $p^3 =$ | $\begin{pmatrix} 1234567 \\ 2167345 \end{pmatrix}$ | $\longrightarrow$ 3 | 3 | 4 | 5 | 6 | 7 | 8 | 9 | 0 | 1 | 2 |
| $p^4 =$ | $\begin{pmatrix} 1234567 \\ 1273456 \end{pmatrix}$ | $\longrightarrow$ 4 | 4 | 5 | 6 | 7 | 8 | 9 | 0 | 1 | 2 | 3 |
| $p^5 =$ | $\begin{pmatrix} 1234567 \\ 2134567 \end{pmatrix}$ | $\longrightarrow$ 5 | 5 | 6 | 7 | 8 | 9 | 0 | 1 | 2 | 3 | 4 |
| $p^6 =$ | $\begin{pmatrix} 1234567 \\ 1245673 \end{pmatrix}$ | $\longrightarrow$ 6 | 6 | 7 | 8 | 9 | 0 | 1 | 2 | 3 | 4 | 5 |
| $p^7 =$ | $\begin{pmatrix} 1234567 \\ 2156734 \end{pmatrix}$ | $\longrightarrow$ 7 | 7 | 8 | 9 | 0 | 1 | 2 | 3 | 4 | 5 | 6 |
| $p^8 =$ | $\begin{pmatrix} 1234567 \\ 1267345 \end{pmatrix}$ | $\longrightarrow$ 8 | 8 | 9 | 0 | 1 | 2 | 3 | 4 | 5 | 6 | 7 |
| $p^9 =$ | $\begin{pmatrix} 1234567 \\ 2173456 \end{pmatrix}$ | $\longrightarrow$ 9 | 9 | 0 | 1 | 2 | 3 | 4 | 5 | 6 | 7 | 8 |

It is possible to realize this composition by using a single permutation network to which one of the permutations corresponding to the first operand is implemented as an input as shown in FIG. 7. If the permutation network is programmed or controlled to realize the inverse of the permutation corresponding to the second operand, then the resultant output of the permutation network directly yields the permutation which represents the product of the two operands. Thus in this case, permutations are viewed as ordered tuples of numbers. The permutation which corresponds to one of the two operands enters the network on the left, but the product is read as an ordered tuple on the right.

Now that it has been established that addition and multiplication can be carried out by composing permutations, the complexity of these operations must further be considered.

Theorem 3. For each r; $0 \leq r \leq 24$, there exists at least one prime m; $2^r \leq m \leq 2^{r+1}$, for which $(H_{m-1}, \bullet)$ can be realized by a permutation network with about $(\log_2 a)\cdot\log_2\log_2 m$ switches and about $(\log_2\log_2 m)$ depth.

Proof: Let $m-1$ have the prime factorization $$m - 1 = m_1^{q_1} m_2^{q_2} \ldots m_k^{q_k}.$$

The set of permutations generated by a cycle of length $$m_i^{q_i}$$

can be realized on a network with about $$(m_i^{q_i} \log m_i^{q_i}) \text{ switches and} (\log m_i^{q_i}) \text{depth}.$$

Furthermore $(H_{m-1}, \bullet)$ is generated by k disjoint cycles of lengths $$m_1^{q_2}, m_2^{q_2}, \ldots m_k^{q_k}.$$

Thus, the entire network can be realized with no more than $$(\Sigma_{i=1}^{k} m_i^{q_i} \log_2 m_i^{q_i})$$

switches, and at most $$(\log_2 \{m_i^{q_i}\}_{max})$$

depth where $$\{m_i^{q_i}\}_{max}$$

denotes the largest element in the set $$\{m_1^{q_1}, m_2^{q_2}, \ldots, m_k^{q_k}\}.$$

Now, $$\log_2\{m_i^{q_i}\}_{max} \leq \log_2 \text{Deg}(m)$$

and $$\Sigma_{i=1}^{k}(m_i^{q_i}\log_2 m_i^{q_i}) \leq [\Sigma_{i=1}^{k} m_i^{q_i}]\log_2\{m_i^{q_i}\}_{max} \leq \text{Deg}(m)\log_2\text{Deg}(m).$$

But, by Theorem 2, for all r; $1 \leq r \leq 24$, there exists a prime $m; 2^4 \leq m < 2^{r+1}$, for which $\text{Deg}(m) = \text{about}$ $(\log_2 m)$ and hence the statement follows. ||

Corollary 3.1: For any m; $1 \leq m \leq 2^{24}$, we can add (or subtract) any two integers whose sum (difference) is less than m, using a permutation network with about $(\log_2 m)\log_2\log_2 m$ switches and about $(\log_2\log_2 m)$ depth.

Corollary 3.2: For any m; $1 \leq m \leq 2^{24}$, we can multiply any two integers whose product is less than m, using a permutation network with about $(\log_2 m)\log_2\log_2 m$ switches and about $(\log_2\log_2 m)$ depth.

As was previously described with regard to FIG. 2, one embodiment of the encoding device 7 is to utilize the microprocessor 13 operating to access prestored permutations corresponding to operands prestored in a memory 15. This memory, can be, for example, a read only memory. Thus, the stored permutations corresponding to operands would be stored in ROM tables, such as that previously described with regard to Table 3. Thus, for multiplication of the numbers 2 ⊗ 9 in modulo 11, as is illustrated in Table 3, the permutations corresponding to $\rho^1$ and $\rho^6$ (utilized for 2 and 9 in multiplication) could be accessed via memory 15. These permutations could then be accessed by microprocessor 13 and implemented on permutation network 9.

FIG. 3 illustrates one exemplary embodiment of a network realization of an actual permutation network. Permutations are merely simple cyclicial shifts of elements. Any cyclic permutation can be implemented by a barrel shifter network 17, with elements 19 and 23, etc., shown in FIG. 3. This is a standard structure in VLSI design and can be implemented with about $(g^2)$ gates where g is the number of elements in the permutation. For unlimited transistor fanout, the delay through a barrel shifter is constant but for a fixed fanout, the delay is $\log_f(g)$ where f is the fanout.

The permutations of the first and second operand are output from encoding device 7, shown in FIG. 3 through lines 18 and 20, respectively. FIG. 3 illustrates the data lines, namely the lines carrying sequential values corresponding to the permutations of the first operand, connected to both barrel shifters 19 and 23. Such an illustration of the two barrel shifters in the barrel shifting network 17 is only exemplary and, as will subsequently be described, only certain of the barrel shifters in the barrel shifting network 17, will be utilized in any given operation.

In performing multiplication in modulo 11, for example, it must be done in terms of an isomorphism of a cyclic permutation group of order $m-1=10$. The value "10" is then factored into prime numbers, namely those of 2 and 5, by a factoring device 3. Thus, for a value "10", the degree (of Table 2) or number of input lines which can be utilized in the permutation network is "7" (namely, $2+5$). Accordingly, such sets of input lines can be implemented by a 2 input and 5 input barrel shifter as is shown by elements 19 and 23 of FIG. 3.

The encoding device 7 converts the first operand into a permutation of a plurality of sequential values, equal in number to the number of inputs for barrel shifters to be utilized (as was obtained via factoring device 3, for example). For example, in modulo 11 multiplication, a permutation of a first operand can be that of seven sequential values such that two values will be input to barrel shifter 19 and five values can be input to barrel shifter 23 along data lines 18.

Further, with regard to control lines 20, the number of shifts performed by each of the barrel shifters will be controlled by the permutation of the second operand. The permutation of the second operand correspond to the particular permutation amount of shifts depending upon the particular permutation values. The shifts can be stored in a memory (not shown) in an addition or multiplication map, for example, dependent upon the particular operation to be performed, within permutation network 9 or within the encoding device 7. Accordingly, a particularly permutation value will designate a predetermined number of shifts to be performed by the barrel shifter. Thereafter, with these shifts performed, the values will be output through output lines 22, for example, of the barrel shifters 19 and 23 and thereafter output for decoding by decoder 11. Accordingly, as previously stated, such a barrel shifter network 17 is merely one exemplary way of realizing a permutation network 9 of the present invention.

FIG. 4 illustrates an alternate embodiment of the encoding device 7. In this embodiment, the first and second operands and the operator are input from input device 1 to microprocessor 13. This microprocessor has been preprogrammed with algorithms known to those of ordinary skill in the art, such that it can implement permutations for each of the first and second operands. The permutations can then be output to a permutation network 9 for subsequent operations as have been previously described.

Finally, FIG. 5 illustrates another alternate embodiment for realization of the permutation network 9. In this embodiment, the permutations of the first operand is implemented on the permutation network through data lines 24(a) to 24(g). These lines correspond to the seven sequential values corresponding to an implemented permutation, as is shown in Table 3 and has been previously described, for example.

The values of the permutation corresponding to the second operand are implemented through control lines 26(a) to 26(g) to the permutation network 9. These control lines are then input to a corresponding one of a plurality of switch control circuits 25(a) to 25(g). Similarly, the input data lines 24(a) to 24(g) are also connected to a corresponding one of a plurality of switch control circuits 25(a) to 25(g). These switch control circuits, select a particular output line 28(a) to 28(q) based upon the particular particular output line 28(a) to 28(g) based upon the particular value of the permutation obtained which corresponds to the second operand (as is shown in FIG. 7 and has been previously described when implemented on a single network, it is the inverse of this second operand which is utilized to determine each of these control values of the second permutation).

Thus, the data input on lines 24(a) to 24(g) will then be output on the selected line 28(a) to 28(g). Only one particular output line will be selected corresponding to only one particular input line. Therefore, if a value 1 is input on line 24(a) and switch control device 25(a) via switch 30(a) selects output line 28(b), the value "1" will be output on that line 28(b). Similarly, if a data value "6" is input on line 24(e) and switch control device 25(e), through switch 30(e), selects output line 28(d), that value "6" will be output on line 28(d). Such selection of the switch to a particular output line is determined based on the corresponding control line 26(a) to 26(g), as has been previously described.

For an actual exemplary implementation of particular values being input and output and particular input lines being connected to particular output lines, reference can be made to FIG. 7, for example, showing value "1" being connected from the first input line to the second output line and value "6" being connected from the fifth input line to the fourth output line. Further, it should be noted that connection of a plurality of lines and utilization of a plurality of switches have merely been illustrated in FIG. 5 in an exemplary manner such that each input data line and each input control line 26(a) to (g) are input to a corresponding switch control device 25(a). Further, a switching element 30(a) to (g) exists, corresponding to each switch control circuit such that each switch 30(a) to (g) (only 30(a) and 30(e) being illustrated) can connect to any of output lines 28(a) to (g). As previously stated, each input line is connected to one and only one output line. The output values of the resultant permutation of the permutation network can then be sent to a decoder 11 for decoding or converting of the resultant permutation to a resultant value.

Thus, a system and method for performing modular arithmetic on a permutation network has been described in an exemplary fashion. A plurality of encoding devices and a plurality of permutation networks have been described, but it should be noted that such have only been utilized in an exemplary manner and should not be considered in any way limiting.

One obvious advantage of the approach illustrated by the system and method of the present invention over conventional arithmetic algorithms rests with the fact that all arithmetic can be performed on the same structure, namely a permutation network, rather than a different circuit for each arithmetic operation. Thus, one would not need a separate adder and multiplier, for example, when utilizing the permutation networks to the present invention. Thus, when confined to just the arithmetic, permutation networks provide an additional alternative to conventional arithmetic circuits.

Further, although the conversion of the elements of $G_{m+1}$ or $Z_m$ to those of $H_m$ may be complex, one way has been illustrated to circumvent the conversion problem, namely by storing permutations corresponding to operands in ROM tables, as described regarding FIG. 2, which is quite acceptable for m. In fact, in certain cases, m need not be large; for example, in arithmetic algorithms, which use the Chinese remainder theorem, a set of relatively prime numbers is all that is required, which can be fairly small.

Thus, any algebraic operation, such as a polynominal operation, for example, or any group of numbers which can be implemented on a group table, such as a matrices, can be converted to a group representing the particular polynominal or particular group table and the permutations can be implemented onto a permutation network, along with any algebraic operation. Further, the permutation network can be varied such that any cross-bar switching network, optical network, barrel shifting network, or equivalent networks, can be utilized to perform the arithmetic operation on the permutations of the operands. Accordingly, for such a system and method, vast implementations are possible such as those to replace conventional adders, multipliers, arithmetic circuits, signal processing circuits and coding and encryption circuits. It can improve upon both the cost and speed of arithmetic circuits. Paralleling of arithmetic circuits and algorithms, matrix algebra circuits and algorithms, signal processing circuits and algorithms and coding and encryption circuits and algorithms can thus be replaced via the system and method of the present invention.

With the invention being thus described, it will be obvious that the same may be varied in many ways. Such variation are not to be regarded as a departure from the spirit and scope of the invention and all such modifications as would be obvious to one skilled in the art are intended to be included within the scope of the following claims.

What is claimed is:

1. A method of performing any one of a plurality of modular arithmetic operations on a cascaded plurality of permutation networks, comprising the steps of:
   (a) inputting a modular arithmetic expression, including first operand, second operand, a modular operator, and a prime modular base from an input device;
   (b) factoring said prime modular base into a plurality of prime factors;
   (c) converting said first operand, based upon said plurality of prime factors and said modular operator, to a first permutation in a converting device, operatively interacting with the input device;
   (d) converting said second operand based upon said plurality of prime factors and said modular operator, to a second permutation in the converting device;

(e) implementing said first permutation on a first permutation network;

(f) implementing said second permutation on a second permutation network, cascaded to said first permutation network;

(g) reconfiguring inputs and outputs of the first and second permutation networks based upon the implementation of steps (e) and (f);

(h) producing a resultant permutation output from said reconfigured second permutation network based upon said reconfigurations of step (g);

(i) converting said resultant permutation, based upon said plurality of prime factors, into a resultant value; and (j) outputting said resultant value.

2. The method of claim 1, wherein said step (c) includes converting the first operand into a first permutation of a plurality of sequential values based upon said plurality of prime factors and said modular operator.

3. The method of claim 2, wherein said step (d) includes:
converting the second operand into a second permutation of a plurality of sequential values based upon said plurality of prime factors and said modular operator.

4. The method of claim 3, wherein said first and second permutations of said first and second operand, respectively, are retrieved from a memory.

5. The method of claim 3, wherein said first and second permutations of said first and second operands, respectively, are calculated based upon a predetermined algorithm.

6. The method of claim 2, wherein said first and second permutation networks each include a plurality of inputs and outputs, said outputs of said first permutation network cascaded to said inputs of said second permutation network wherein said step (e) includes:
connecting each of said plurality of inputs of said first permutation network to one and only one of said plurality of outputs of said first permutation network, and
wherein said step (f) includes connecting each of said plurality of inputs of said second permutation network to one and only one of said plurality of outputs of said second permutation network.

7. A method of performing any one of a plurality of arithmetic operations on a cascaded plurality of permutation networks comprising the steps of:
(a) inputting an arithmetic expression, first operand, second operand, and an arithmetic operator from an input device;
(b) converting said first operand based upon said arithmetic operator, to a first permutation in a converting device, operatively interacting with the input device;
(c) converting said second operand based upon said arithmetic operator, to a second permutation in the converting device;
(d) implementing said first permutation on a first permutation network;
(e) implementing said second permutation on said second permutation network, cascaded to said first permutation network;
(f) reconfiguring inputs and outputs of the first and second permutation networks based upon the implementation of steps (d) and (e);

(g) producing a resultant permutation output from said reconfigured second permutation network based upon said reconfiguration of step (f);

(h) converting said resultant permutation, into a resultant value; and (i) outputting said resulting value.

8. The method of claim 7, wherein said input arithmetic expression includes a first and second group table as said first and second operand.

9. The method of claim 7, wherein said cascaded plurality of permutation networks include an optical switching network.

10. The method of claim 7, wherein said cascaded plurality of permutation networks include a crossbar switching network.

11. The method of claim 7, wherein said arithmetic expression includes a first and second matrix as said first and second operand.

12. A system for performing any one of a plurality of modular arithmetic operations on a cascaded plurality of permutation networks, comprising:
input means or inputting a modular arithmetic expression, including first operand, second operand, a modular operator, and a prime modular base;
means for factoring a reduced value of said input prime modular base into a plurality of prime factors;
first converting means for converting said first operand based upon said plurality of prime factors and said modular operator, to a first permutation and implementing the first permutation on a first permutation network to reconfigure inputs and outputs of the first permutation network, and for converting said second operand based upon said plurality of prime factors and said modular operator, to a second permutation and implementing the second permutation on a second permutation network to reconfigure inputs and outputs of the second permutation network, cascaded to the first permutation network;
second converting means for converting a resultant permutation produced and output from said reconfigured second permutation network into a resultant value; and
output means for outputting said resultant value.

13. The system of claim 12, wherein said first converting means includes:
means for converting the first operand into a first permutation of a plurality of sequential values based upon said plurality of prime factors.

14. The system of claim 13, wherein said first and second permutation networks each include a plurality of inputs and outputs, said outputs of said first permutation network being cascaded to said inputs of said second permutation network.

15. The system of claim 14, wherein said first and second permutation networks include an optical switching network.

16. The system of claim 14, wherein said first and second permutation networks include a crossbar switching network.

17. The system of claim 14 wherein said arithmetic expression includes a first and second polynomial as said first and second operand.

18. The system of claim 12, wherein said second converting means includes:
means for converting the second operand into a second permutation of a plurality of sequential values based upon said plurality of prime factors and said modular operator.

19. The system of claim 18, wherein said first and second permutations of said first and second operands, respectively, are retrieved from a memory.

20. The system of claim 18, further comprising:
calculating means for converting and outputting said plurality of sequential values for each of said first and second operand, based upon a predetermined algorithm.

21. A system for performing any one of the plurality of arithmetic operations on a cascaded plurality of permutation networks, comprising:
input means for inputting an arithmetic expression, including first operand, second operand, and an arithmetic operator;
first converting means for converting said first operand based upon the arithmetic operator, to a first permutation and implementing the first operand permutation on a first permutation network to reconfigure inputs and outputs of the first permutation network, and for converting said second operand based upon the arithmetic operator, to a second permutation and implementing the second permutation on a second permutation network to reconfigure inputs and outputs of the second permutation network, cascaded to the first permutation network; and
second converting means for converting a resultant permutation produced and output from said second reconfigured permutation network into a resultant value; and
output means for outputting said resultant value from said decoding means.

22. The system of claim 21, wherein said first converting means includes:
means for converting the first operand into a first permutation of a plurality of sequential values based upon said arithmetic operator.

23. The system of claim 22, wherein said first converting means further includes:
means for converting the second operating into a second permutation of a plurality of sequential values based upon said arithmetic operator.

24. The system of claim 23, wherein said plurality of sequential values for said first and second permutation are retrieved from memory.

25. The system of claim 23, further comprising:
calculating means for converting and outputting said plurality of sequential values for each of said first and second operand, based upon a predetermined algorithm.

26. The system of claim 21, wherein said arithmetic expression includes a first and second polynomial as said first and second operand.

27. The system of claim 21 wherein said arithmetic expression includes a first and second group table as said first and second operand.

28. The system of claim 17 wherein said arithmetic expression includes a first and second matrix as said first and second operand.

29. A method for performing any one of a plurality of modular arithmetic operations on a permutation network comprising the steps of:
(a) inputting a first operand, a second operand, a modular operator and a prime modular base from an input device;

(b) subtracting from the modular base to get a non-prime modular base;
(c) factoring that non-prime modular base into ascending prime factors;
(d) converting said first operand, based upon said arithmetic operator and said ascending prime factors to a first permutation to a converting device, operatively interacting with the input device,
(e) converting said second operand, based upon said arithmetic operator and said ascending prime factors, to a second permutation;
(f) implementing said first permutation on a first permutation network;
(g) reconfiguring inputs and outputs of said permutation network based upon said second permutation, to produce and output a resultant permutation;
(h) converting said resultant permutation to a resultant value;
(i) outputting said resultant value from step (h).

30. The method of claim 29, wherein step(g) includes connecting a plurality of inputs of said permutation network to a plurality of outputs of said permutations network.

31. The method of claim 29, wherein step (g) includes controlling a plurality of barrel shifters.

32. The method of claim 29, wherein in steps (d), (e) and (h), said first and second permutations and said resultant value are retrieved from a lookup table.

33. A method for performing any one of a plurality of arithmetic operations on a permutation network comprising the steps of:
(a) inputting a first operand, a second operand, and an arithmetic operator from an input device;
(b) converting said first operand, based upon said arithmetic operator to a first permutation in a converting device, operatively interacting with the input device;
(c) converting said second operand, based upon said arithmetic operator, to a second permutation in the converting device;
(d) implementing said first permutation on a first permutation network;
(e) reconfiguring inputs and outputs of said permutation network based upon said second permutation, to produce a resultant permutation;
(f) converting said resultant permutation to a resultant value;
(g) outputting said resultant value from step (f).

34. The method of claim 33, wherein step (e) includes connecting a plurality of inputs of said permutation network to a plurality of outputs of said permutation network.

35. The method of claim 33, wherein in step (e) includes controlling a plurality of barrel shifters.

36. The method of claim 33, wherein in steps (b), (c) and (f), said first and second permutations and said resultant value are retrieved from a lookup table.

37. A system for performing any one of a plurality of modular arithmetic operations on a permutation network comprising:
input means for inputting a first operand, a second operand, a modular operator and a prime modular base;
subtracting means for subtracting from the prime modular base to get a non-prime modular base;
factoring means for factoring the non-prime modular base into ascending prime factors;

first converting means for converting said first operand, based upon said arithmetic operator and said ascending prime factors, to a first permutation and for converting said second operand, based upon said arithmetic operator and said ascending prime factors, to a second permutation;

implementing means for implementing said first permutation on a permutation network;

reconfiguring means for reconfiguring inputs and outputs of said permutation network based upon said second permutation to produce and output a resultant permutation;

second converting means for converting said resultant permutation to a resultant value; and output means for outputting said resultant value from said second converting means.

38. The system of claim 37, wherein said reconfiguring means connects a plurality of inputs of said permutation network to a plurality of outputs of said permutation network.

39. The system of claim 37, wherein said reconfiguring means shifts a plurality of barrel shifters.

40. The system of claim 37, wherein said first and second permutations and said resultant value are retrieved from a lookup table.

41. A system for performing any one of a plurality of arithmetic operations on a permutation network comprising:

input means for inputting a first operand, a second operand, and an arithmetic operator;

first converting means for converting said first operand, based upon said arithmetic operator to a first permutation and for converting said second operand, based upon said arithmetic operator, to a second permutation;

implementing means for implementing said first permutation on a permutation network;

controlling means for reconfiguring said inputs and outputs of permutation network based upon said second permutation to produce and output a resultant permutation;

second converting means for converting said resultant permutation to a resultant value; and output means for outputting said resultant value from said second converting means.

42. The system of claim 41, wherein said controlling means connects a plurality of inputs of said permutation network to a plurality of outputs of said permutation network.

43. The system of claim 41, wherein said controlling means controls a plurality of barrel shifters.

44. The system of claim 41, wherein said first and second permutations and said resultant value are retrieved from a lookup table.

* * * * *